US012783154B2

(12) United States Patent
Fibranz et al.

(10) Patent No.: US 12,783,154 B2
(45) Date of Patent: Nov. 3, 2026

(54) METHOD AND DEVICE FOR READING CONFIGURATION DATA OF AN INTEGRATED CIRCUIT

(71) Applicant: Robert Bosch GmbH, Stuttgart (DE)

(72) Inventors: Heiko Fibranz, Reutlingen (DE); Carsten Mitter, Ditzingen (DE); Michael Eichler, Rottenburg/Oberndorf (DE); Stefan Brucklacher, Wannweil (DE); Steffen Krueger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 18/393,878

(22) Filed: Dec. 22, 2023

(65) Prior Publication Data

US 2024/0220152 A1 Jul. 4, 2024

(30) Foreign Application Priority Data

Jan. 3, 2023 (DE) ..................... 10 2023 200 036.9

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,640,262 | B1 * | 10/2003 | Uppunda | G06F 15/7867 710/33 |
| 7,685,380 | B1 * | 3/2010 | Khu | H03K 19/1776 711/102 |
| 2005/0071730 | A1 * | 3/2005 | Moyer | H03K 19/17764 714/758 |
| 2011/0246702 | A1 * | 10/2011 | Hiremath | G06F 12/0246 711/170 |
| 2015/0052332 | A1 * | 2/2015 | Mortensen | G06F 15/7889 712/37 |
| 2016/0036463 | A1 | 2/2016 | Heisswolf et al. | |
| 2016/0246672 | A1 * | 8/2016 | Yang | G06F 3/064 |

FOREIGN PATENT DOCUMENTS

| | | | |
|---|---|---|---|
| DE | 2501887 | A1 | 11/1975 |
| DE | 10 2016 112 552 | A1 | 1/2017 |
| DE | 11 2015 005 315 | B4 | 3/2022 |

* cited by examiner

*Primary Examiner* — Kaushikkumar M Patel
(74) *Attorney, Agent, or Firm* — Norton Rose Fulbright US LLP

(57) ABSTRACT

A device and a method for reading configuration data of an integrated control unit. The method includes: reading data words from memory locations in a predefined direction, starting from a first memory location; determining that a last-read data word from a third memory location is an original data word that is lowest in the hierarchy and, in response to the realization that a second data word is immediately adjacent to the lowest original data word in the hierarchy in the opposite direction to a predefined direction, using the second data word as configuration data.

12 Claims, 1 Drawing Sheet

METHOD AND DEVICE FOR READING CONFIGURATION DATA OF AN INTEGRATED CIRCUIT

FIELD

The present invention relates to a method and a device for reading configuration data of an integrated circuit.

BACKGROUND INFORMATION

Application-specific integrated circuits (ASIC for short) are described in the related art. An ASIC is an electronic circuit. In the related art, ASICs are used in electronic devices such as clock radios or graphics processors, and are primarily used for mass-produced products. They often integrate a large number of logic functions. As is conventional, ASICs can have fully or partially customized logic blocks and/or have a customized circuit design and/or be configured to perform standard functions and/or have pre-configured standard gates. When a supply voltage is applied to an ASIC, an internal boot process usually takes place, in which, among other things, configuration data are read from a non-volatile memory (NVM) and stored in, for example, trim registers. In particular, the configuration data can contain block-specific information on read and write authorizations. When dividing an ASIC into function blocks, for example, blocks can contain firmware that is imported once during production and may never be changed. Other blocks can contain, for example, an operating system that only a prespecified person may change, or other blocks can contain customer programs that may be overwritten frequently and by customers. In other words, read and write authorization is highly relevant, not least for security reasons. Configurations can be changed during the product life cycle of an ASIC. To do this, the data present must be deleted and the new information must then be stored. A deletion process of a sector of, for example, 256 words of a flash memory takes approximately 20 ms and a programming process approximately 10 μs. If the supply voltage is switched off during the deletion or programming process, it is possible that no configuration data will be available. In such a case, the ASIC will not be protected as intended.

German Patent Application No. DE 10 2016 112 552 A1 describes data encryption and decryption on the basis of a device and data authentication. The method provides for the use of a session key to generate a message authentication code in connection with a communication session between the device and a second device. The device determines, on the basis of the session key, a cryptographic key for encoding or decoding a message in connection with the second device. The device then encodes or decodes the message on the basis of the cryptographic key.

German Patent No. DE 11 2015 005 315 B4 describes an integrated circuit device comprising a plurality of analog blocks, a fixed-function analog circuit, a plurality of reconfigurable analog circuit blocks, an analog routing block that is reconfigurable to provide signal paths between the analog blocks, and a digital subsection comprising digital circuits.

An object of the present invention is to provide a reading process for ascertaining configuration data of an ASIC, which increases security in the intended use of the ASIC. This is intended to prevent manipulation in particular.

SUMMARY

The achievement of this object may be effected by the features of the present invention. Preferred developments of the present invention are disclosed herein.

An integrated circuit is, for example, a chip, which preferably has a microcontroller and a memory. The integrated circuit can be configured as a control unit, for example. In particular, the integrated circuit can be configured as a control unit for a means of transportation or a system of a means of transportation (for example, a car, ship, bicycle, e-bike, etc.). In a first step of the method according to an example embodiment of the present invention, data words are read from memory locations in a predefined direction. The predefined direction can be characterized, for example, by the counter of memory location B, from which a data word is read at point in time 2, being higher than the counter of memory location A, from which a data word is read at point in time 1, wherein point in time 1 is before point in time 2. According to the present invention, reading is carried out in particular starting from a first memory location. The first memory location can be predefined. Additionally or alternatively, the first memory location can be characterized by the lowest value of a memory location of a plurality of values of memory locations being assigned to this memory location. Finally, the first memory location can be selected at random. The first memory location is particularly preferably predefined for a defined product. The first memory location is preferably predefined. In particular, reading data words from memory locations can follow a logic. The logic can be implemented in program form. Additionally or alternatively, it can be determined that the last data word read was read from the last memory location and that it is therefore not possible to read a data word from another memory location in the predefined direction. In a second step of the method according to the an example embodiment of the present invention, it is automatically determined that a last data word read from a third memory location is an original data word that is lowest in the hierarchy. An original data word is preferably a data word that does not contain any configuration data. The original data word preferably contains the data value of a deleted memory. The data value of a deleted memory is preferably represented by the data word with all bits=1. Additionally or alternatively, the data value of a deleted memory is represented by the data word with all bits=0. The original data word preferably thus contains a data word with an invalid checksum. An original data word can be set, for example, if the memory locations of the memory of the integrated control unit are deleted during production. An original data word that is lowest in the hierarchy is characterized in particular by the value of the memory location of the original data word, starting from the first memory location and taking into account the predefined direction, having the lowest value of a plurality of values of memory locations with original data words. In response to the finding that a second data word, in the opposite direction to a predefined direction, is immediately adjacent to the lowest original data word in the hierarchy, the second data word is used as configuration data in a fifth step of the method according to the present invention. In other words, the second data word is read in particular immediately before the original data word with the lowest hierarchy is read and is ascertained and used as valid configuration data in response to finding the original data word with the lowest hierarchy. In a particularly preferred embodiment of the present invention, the valid configuration data can be additionally stored as a further data word, in the opposite direction to a predefined direction, immediately adjacent to the second data word. If the second data word is damaged, the adjacent data word can be used. If the programming process is aborted after the second data word has been programmed, a valid configuration would already be present and the redundant storage of the valid data word could be carried out at a later point in time. To use the configuration data, it is stored in a temporary memory.

Preferred developments of the present invention are disclosed herein.

According to an example embodiment of the present invention, reading the data words from memory locations in a predefined direction preferably affects memory locations immediately adjacent to one another. In other words, the value of the memory location read first is increased by "1" so that the adjacent memory location is then read.

In particular, search algorithms can be used to achieve an efficient search for valid configuration data. For example, when reading data words from memory locations in the predefined direction, memory locations in particular can be skipped in a predefined manner. Additionally or alternatively, memory locations can be skipped in the opposite direction to a predefined direction. In one possible embodiment, when searching for the original word with the lowest hierarchy, for example, the memory location with the value 1 can be read initially and it can be determined that this contains configuration data, then the memory location with the value 20 can be read and it can be determined that this contains an original data word, then the memory location with the value 19 can be read and it can be determined that this contains an original data word, then the memory location with the value 15 is read and it is determined that this contains configuration data, then the memory location with the value 16 is read and it is determined that this contains an original data word and thus the memory location with the value 16 contains the original data word with the lowest hierarchy and thus the data word read at the memory location with the value 15 is to be used as configuration data.

In particular, if in a first step of the method according to the present invention data words are read from memory locations in the opposite direction to a predefined direction, the second data word can be the data word closest to the lowest original data word in the hierarchy in the opposite direction to the predefined direction.

In particular, the configuration data can be logically assigned to a first access authorization. In particular, the memory of the integrated control unit can be divided into different blocks. Each block is preferably assigned an access authorization. A plurality of blocks can also be assigned to the same access authorization. In a particularly preferred embodiment, the access authorization can represent one of eight states. Following this example, 3 bits are preferably required per block configuration to designate the access authorization. If an integrated circuit has 72 blocks, then following the example further, preferably 216 bits are used to store the access authorizations of all blocks. The eight possible states can preferably be defined as follows:

State 1=No deletion or programming of the block; State 2=No deletion of the block possible, programming by authorized instance possible; State 3=Password protection 1; State 4=Password protection 2; State 5=Password protection 3; State 6=Password protection 4; State 7=Password protection 5; State 8=Unprotected block.

According to an example embodiment of the present invention, the configuration data can preferably have the access authorizations for one block or for a number of blocks of the integrated circuit. Additionally or alternatively, the configuration data can represent further information. The configuration data of all blocks is preferably stored as a data word and/or a part of a data word and/or as a plurality of data words.

In particular, the memory locations can be assigned to a memory. In particular, the memory can be a non-volatile memory, preferably a flash memory.

In a third step of the method according to an example embodiment of the present invention, a first checksum can be automatically ascertained from the second data word. In a fourth step, it can be determined that the first checksum is valid. In particular, the checksum can be a security sum for cyclic redundancy checks (so-called cyclic redundancy check checksum). The checksum can be configured in particular to check the validity of the configuration data. In particular, the checksum can be used to ascertain whether there were any errors upon transmission or storage. The checksum preferably has 16 bits of the data word.

In addition, if a first checksum was automatically ascertained from the second data word in a third step of the method according to the present invention, it can be determined in a sixth step of the method according to the present invention that the first checksum is not valid and a first signal representing the fact that the first checksum is not valid can be automatically output in a seventh step.

In particular, if it is determined that the first checksum is not valid, a second checksum can be automatically ascertained from the first data word in an eighth step of the method. In a ninth step of the method according to the present invention, it can be determined that the second checksum is valid and, in response thereto, the first data word can be used as configuration data in a tenth step of the method. Since the valid data word is preferably stored in two consecutive memory locations, if the second data word is damaged a valid data word can still be used by using the first data word.

According to an example embodiment of the present invention, if it is further determined in an eleventh step that the second checksum is also invalid, a second signal representing the invalidity of the first data word and the invalidity of the second data word can preferably be output in a twelfth step.

According to an example embodiment of the present invention, in a thirteenth step of the method, it can be determined that each bit of the second data word is equal to one. Additionally or alternatively, in the thirteenth step of the method, it can be determined that each bit of the second data word is zero. In response to the determination, a third signal can be output in a fourteenth step of the method, representing the determination that each bit of the second data word is equal to one or equal to zero. If all bits of a data word are equal to zero or one, the data word represents in particular a deleted memory and/or an original data word.

According to a second aspect of the present invention, a device for reading configuration data of an integrated circuit is proposed. The device comprises a data input, an evaluation unit and a data output. The device can be permanently installed in a means of transportation. In particular, data can be transmitted to the evaluation unit via the data input and, in particular, data can be output from the evaluation unit via the data output, whereby the evaluation unit is thus configured to read data words from memory locations in a predefined direction starting from a first memory location, to determine that a data word read last from a third memory location is an original data word that is lowest in the hierarchy and, in response to the finding that a second data word is immediately adjacent to the lowest original data word in the hierarchy, in the opposite direction to a predefined direction, to use the second data word as configuration data. Accordingly, the device is arranged to carry out the features, combinations of features and advantages of the first-mentioned aspect of the present invention, which is why reference is made to the above explanations in order to avoid repetition.

Further details, advantages and features of the present invention are shown in the following description of exemplary embodiments of the present invention with reference to the figures.

DETAILED DESCRIPTION OF EXAMPLE EMBODIMENTS

Figure 1:
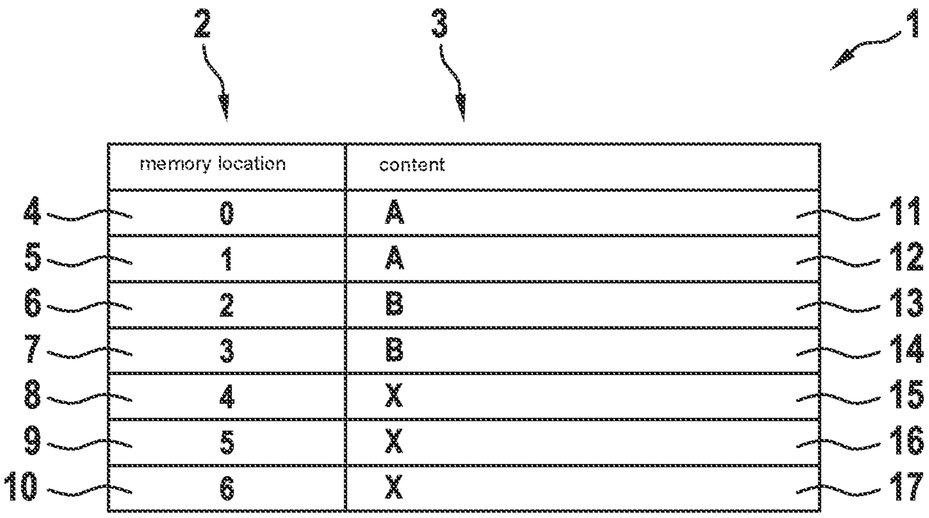
FIG. 1 shows a database of an exemplary embodiment of a device according to an example embodiment of the present invention.
Figure 2:
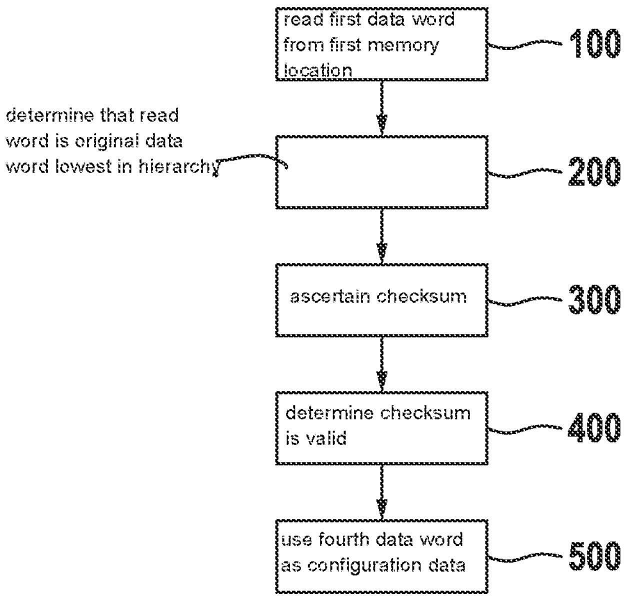
FIG. 2 shows a flowchart illustrating steps of an exemplary embodiment of a method according to an example embodiment of the present invention for reading configuration data of an integrated circuit.

In addition to the foregoing written description of the present invention, explicit reference is hereby made to the graphic representation of the present invention in FIGS. 1 and 2 for its supplementary disclosure.

FIG. 1 shows a database 1 in which memory locations are assigned line by line in a first column 2 and data words are assigned line by line in a second column 3. The first data word 11 is assigned to the first memory location 4, the second data word 12 to the second memory location 5, the third data word 13 to the third memory location 6, the fourth data word 14 to the fourth memory location 7, the fifth data word 15 to the fifth memory location 8, the sixth data word 16 to the sixth memory location 9 and the seventh data word 17 to the seventh memory location 10. The first data word 11 and the second data word 12 are identical and represent a first data word ("A"). The first data word is the first stored data word. The third data word 13 and the fourth data word 14 are identical and represent a second data word ("B"). The second data word is the valid data word. The fifth data word 15, the sixth data word 16 and the seventh data word 17 are identical and represent an original data word ("X").

FIG. 2 shows a flowchart with steps of a method according to the present invention for reading configuration data of an integrated circuit. In a first step 100, the first data word is read from the first memory location at a first point in time and it is determined that this is not an original data word. The second data word is then read from the second memory location at a second point in time and it is determined that this is not an original data word. The third data word is then read from the third memory location at a third point in time and it is determined that this is not an original data word. The fourth data word is then read from the fourth memory location at a fourth point in time and it is determined that this is not an original data word. The fifth data word is then read from the fifth memory location at a fifth point in time and in a second step 200 it is determined that this is the original data word with the lowest hierarchy. In response thereto, a checksum is ascertained from the fourth data word in a third step 300 and it is determined in a fourth step 400 that the checksum is valid.

In response to the finding of the validity of the checksum, the fourth data word is used as configuration data in a fifth step 500.

The invention claimed is:

1. A method for reading configuration data of an integrated circuit, comprising the following steps:

reading data words from memory locations in a predefined direction, starting from a first memory location;

determining that a last-read data word from a memory location, that, in the predefined direction starting from the first memory location, contains an original data word that is lowest in a hierarchy; and in response to determining that a second data word immediately before the original data word that is lowest in the hierarchy in the predefined direction, using the second data word as configuration data, wherein the second data word is valid as configuration data based on being stored immediately before an original data word representing a deleted memory state and/or passing a checksum test.

2. The method according to claim 1, wherein the reading of the data words from memory locations in the predefined direction in each case concerns memory locations immediately adjacent to one another.

3. The method according to claim 1, wherein the second data word is that data word closest to the lowest original data word in the hierarchy in the opposite direction to the predefined direction.

4. The method according to claim 1, wherein the configuration data are logically assigned to a first access authorization, for reading in a predefined memory region and/or writing in the predefined memory region.

5. The method according to claim 1, wherein the memory locations are assigned to a memory, wherein the memory is a non-volatile memory.

6. The method according to claim 5, wherein the memory is a flash memory.

7. The method according to claim 1, further comprising:

automatically ascertaining a first checksum from the second data word; and determining that the first checksum is valid.

8. The method according to claim 1, further comprising:

automatically ascertaining a first checksum from the second data word;

determining that the first checksum is not valid; and automatically outputting a first signal representing the fact that the first checksum is not valid.

9. The method according claim 8, further comprising:

automatically ascertaining a second checksum from the first data word;

determining that the second checksum is valid; and in response to determining the second checksum is valid, using the first data word as configuration data.

10. The method according claim 8, further comprising:

automatically ascertaining a second checksum from the first data word;

determining that the second checksum is not valid; and in response to determining that the second checksum is not valid, automatically outputting a second signal representing the fact that the first checksum and the second checksum are not valid.

11. The method according to claim 1, further comprising:

determining that each bit of the second data word is equal to one and/or determining that each bit of the second data word is equal to zero; and in response to determining that each bit of the second data work is equal to one or determining that each bit of the data data word is equal to zero, Outputting a third signal.

12. A device for reading configuration data of an integrated circuit, the device comprising a data input, an evaluation unit, and a data output, wherein the evaluation unit is configured to:

read data words from memory locations in a predefined direction starting from a first memory location, determine that a last-read data word from a memory location that, in the predefined direction starting from the first memory location, contains an original data word that is lowest in a hierarchy, and in response to determining that a second data word word stored immediately before the lowest original data word in the hierarchy in the predefined direction, use the second data word as configuration data, wherein the second data word is valid as configuration data based on being stored immediately before an original data word representing a deleted memory state and/or passing a checksum test.

* * * * *